United States Patent [19]

Murata et al.

[11] Patent Number: 5,839,182
[45] Date of Patent: Nov. 24, 1998

[54] MANUFACTURING METHOD FOR CLUTCH DISC SUBASSEMBLY

[75] Inventors: Ikuo Murata, Neyagawa; Hiroshi Teramae, Nara, both of Japan

[73] Assignee: Exedy Corporation, Neyagawa, Japan

[21] Appl. No.: 833,019

[22] Filed: Apr. 3, 1997

Related U.S. Application Data

[62] Division of Ser. No. 512,779, Aug. 9, 1995, Pat. No. 5,651,442.

[30] Foreign Application Priority Data

Aug. 24, 1994  [JP]  Japan .................................. 6-199437

[51] Int. Cl.$^6$ ...................................................... B23Q 3/00
[52] U.S. Cl. ............................................................ 29/464
[58] Field of Search .................................. 29/464, 281.5; 192/107 R, 107 C, 212; 269/43

[56] References Cited

U.S. PATENT DOCUMENTS

| | | | |
|---|---|---|---|
| 4,422,539 | 12/1983 | Werner | 192/107 C |
| 4,564,994 | 1/1986 | Marx | 29/281.5 |
| 5,407,043 | 4/1995 | Yamada | 192/107 R |
| 5,419,422 | 5/1995 | Schraut | 192/107 R |

FOREIGN PATENT DOCUMENTS

| | | | |
|---|---|---|---|
| 2550592 | 2/1985 | France | 192/107 C |

*Primary Examiner*—P. W. Echols
*Attorney, Agent, or Firm*—Shinjyu An Intellectual Property Firm

[57] ABSTRACT

A method for automated assembly of a frictionally engaging clutch disc subassembly, employing a tooling jig in conjunction with appropriately configured subassembly friction facings and cushioning plate, whereby need for post-manufacture rotational balancing is eliminated.

3 Claims, 4 Drawing Sheets

5,839,182

MANUFACTURING METHOD FOR CLUTCH DISC SUBASSEMBLY

This application is a division of application Ser. No. 08/512,779, filed Aug. 9, 1995 now U.S. Pat. No. 5,651,442.

BACKGROUND OF THE INVENTION

A) Field of the Invention

The present invention relates to a method of assembling a clutch disc subassembly using a friction facing alignment jig, and further to configuration of friction facings and a cushioning plate of a clutch disc subassembly.

B) Description of Related Art

In one type of clutch disc assembly, the construction includes a clutch disc main body and a subassembly concentrically joined to the clutch disc main body, functioning to engage frictionally an engine flywheel with a clutch pressure plate. The clutch disc main body incorporates a damper for dampening shock caused as the clutch is engaged, as well as spurious torsional vibrations during power transmission by the clutch. The clutch disc subassembly includes a cushioning plate peripherally fixed to the clutch disc main body, and friction facings fixed by rivets to opposite radially extending sides of the cushioning plate.

The frictionally engaging clutch disc subassembly, when pressed by a pressure plate against an engine flywheel functions to transmit torque from the flywheel to the clutch disc. As the clutch disc subassembly is urged into contact against the flywheel, the cushioning plate deforms elastically, absorbing engagement shock.

In assembling the disc subassembly for the conventional clutch disc as stated above, the cushioning plate is first fixed to a clutch plate assembly of the clutch disc by rivets. One of the pair of friction facings is then fixed to one of the radially extending sides of the cushioning plate by rivets, whereupon the second of the friction facings pair is riveted onto the opposite radially extending side. Herein, there may be no direct coordination between the steps of mounting the one and the other of the friction facings onto the opposite radially extending sides of the cushioning plate. Consequently, the friction facings sandwiching the cushioning plate in the assembled clutch disc are not likely to be perfectly paired, but rather may be out of alignment with respect to each other. Of particular concern is radial misalignment of the opposed friction facings, whereby there is significant disparity in the moment arms of the opposite radially extending sides of the cushioning plate.

Accordingly, unless an operator intervenes in the assembling process to check and ensure proper alignment of the respective components that make up the clutch disc subassembly, the clutch disc will rotate out of balance, and vibrations will develop in the operational friction engaging subassembly as well. The need for operator intervention has impeded automation of the entire clutch disc assembling process.

SUMMARY OF THE INVENTION

Accordingly, it is an object of the present invention to provide a method, involving especially configured parts, for assembling a frictionally engaging subassembly of a clutch disc whereby subassembly components are assembled concentrically into precise alignment with respect to one another, thereby enabling full automation of the clutch disc assembling process and eliminating need for post-manufacture rotational balancing of the clutch disc.

In one aspect of the present invention, a clutch disc is assembled by first providing a cushioning plate and a pair of friction facings each having corresponding preformed locating holes, rivet holes, and rivet recess holes formed therein; then, positioning the locating holes of one friction facing and the clutch disc onto projecting pins on a locating jig thereby aligning the cushioning plate and the one friction facing; inserting rivets into the rivet holes; and deforming the rivets to fix the cushioning plate and the friction facing to one another.

The clutch is further preferably assembled by: removing the cushioning plate from the locating jig; rotating the cushioning plate and the attached friction facing 180° about an axis defined by any two diametrically opposing locating holes; positioning the locating holes of a second friction facing and the cushioning plate and attached friction facing onto projecting pins on a locating jig thereby aligning the cushioning plate and the second friction facing; inserting rivets into the rivet holes; and deforming the rivets to fix the cushioning plate and the second friction facing to one another.

In another aspect of the present invention, a clutch disc is assembled by:

providing first and second friction facing having a plurality of preformed circularly spaced axially extending rivet holes and a plurality of circularly spaced rivet recess holes offset from the rivet holes, providing a cushioning plate having a plurality of circularly spaced rivet shank holes, corresponding to both the rivet holes and the rivet recess holes in the friction facings, and further providing the cushioning plate and both the first and the second friction facings with corresponding pluralities of circularly spaced locating holes, wherein any two farthest apart locating holes, being diametrically opposed, define an axis of locating-hole symmetry with respect to the cushioning plate and the pair of friction facings;

seating a first set of rivets on a plurality of circularly spaced rivet receive seats formed on an annular locating jig, corresponding in position to a first set of the rivet holes, the jig further formed with a plurality of circularly spaced locating pins corresponding to the locating holes;

positioning and seating the first friction facing onto the annular locating jig, wherein the locating pins of the annular locating jig are inserted into the locating holes of the first friction facing, and whereby seated heads of the first set of rivets are brought into the rivet holes of the first friction facing;

positioning the locating holes in the cushioning plate on the locating pins of the annular locating jig and seating the cushioning plate onto the jig thus causing the rivets to extend through the rivet holes in the cushioning plate;

deforming the first set of rivets fastening together the first friction facing and the cushioning plate;

taking the cushioning plate and attached first friction facing, off the annular locating jig;

seating a second set of rivets on the rivet receive seats;

positioning and seating the second friction facing onto the annular locating jig, wherein the locating pins of the annular locating jig are inserted into the locating holes of the second friction facing, whereby seated heads of the second supply of rivets are brought into the rivet holes of the second friction facing;

rotating 180°, on the axis of locating-hole symmetry, the cushioning plate and the attached first friction facing, and positioning the locating holes in the cushioning plate onto the locating pins of the annular locating jig, whereby the first set of rivets are brought into the rivet recess holes of the second friction facing; and deforming the second set of rivets fastening the second friction facings to the cushioning plate.

In another aspect of the invention, a clutch disc assembly includes a clutch disc main body having a cushioning plate peripherally fixed thereto, the cushioning plate having circumferentially spaced axial rivet holes and aligning holes. First and second friction facings, each having spaced apart axial rivet holes and aligning holes, are disposed on opposed radially extending sides of the cushioning plate peripherally such that the cushioning plate is sandwiched between the friction facings. A first set of rivets are fitted into the rivet holes in the first friction facing, extending through and deformed to fasten together the cushioning plate and the first friction facing. A second set of rivets are fitted into the rivet holes in the second friction facing, extending through and deformed to fasten together the cushioning plate and the second friction facing.

In yet another aspect of the present invention, a clutch disc assembly includes a friction facing that is riveted to a cushioning plate while being positioned by projections on a locating jig and forming a friction engaging subassembly of a clutch disc body. Preferably, the friction facing is formed with riveting holes into which rivets are insertable and locating holes into which assembly alignment projections are insertable.

Preferably, the cushioning plate is also formed with riveting holes into which rivets are insertable and locating holes into which assembly alignment projections are insertable.

The various aspects of the present invention allow the cushioning plate and the friction facings to be accurately aligned with one another. Since the friction facings and the cushioning plate are aligned with one another during assembly, both the components are accurately fixed so as to be in proper alignment. Consequently, the finished clutch disc assembly is less likely to rotate out of balance than prior art assemblies, and the friction engaging subassembly less likely to vibrate. The alignment of the cushioning plate with the friction facings makes it possible to eliminate an operator inspection of balance and alignment, and the operation of assembling the friction engaging subassembly can be more fully automated.

These and other objects, features, aspects and advantages of the present invention will become more fully apparent from the following detailed description of the present invention taken in conjunction with the accompanying drawings, where like reference numerals denote corresponding parts throughout, in which:

DETAILED DESCRIPTION OF THE PREFERRED EMBODIMENT

Figure 1:
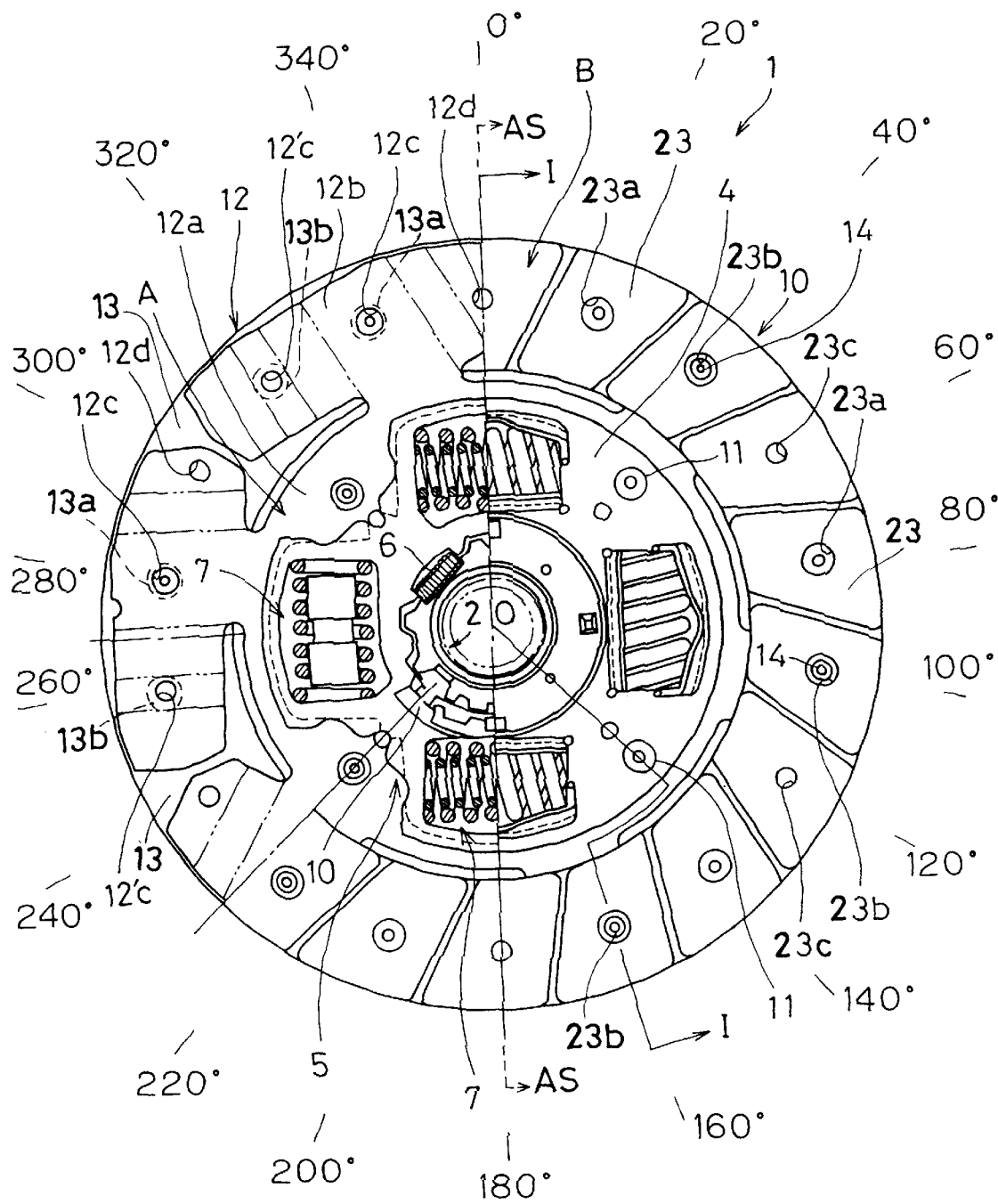
FIG. 1 is a part cut-away, part section, part elevation view of the clutch disc assembly in accordance with the present invention.
Figure 2:
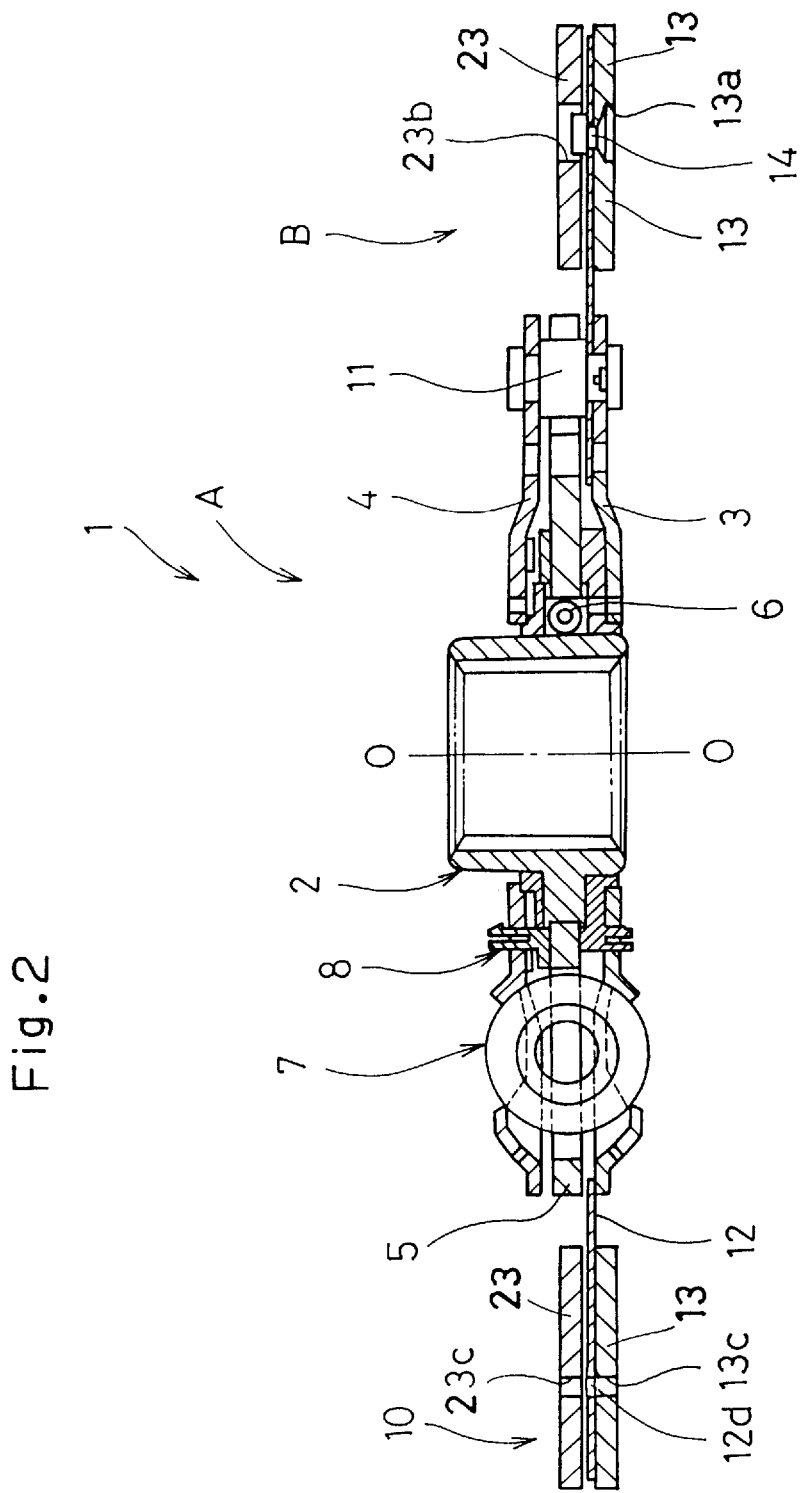
FIG. 2 is an axial section, taken along the line II—II of FIG. 1 on a slightly enlarged scale, schematically illustrating the clutch disc assembly.

A clutch disc assembly 1 in the preferred embodiment of the present invention, as shown in FIG. 1 and FIG. 2, is a device for selectively transmitting torque between an engine (not shown) and a gearbox (not shown). In FIG. 1, the line O—O denotes the rotational axis of the clutch disc assembly 1.

The clutch disc assembly 1 is composed chiefly of a clutch disc main body A to which a friction engaging subassembly B is peripherally fitted.

The clutch disc main body A includes a hub 2 which serves as a power output element; a clutch disc 3 cooperative with a retaining plate 4 which serves as a power input element; an intervening sub-plate 5 disposed between disc 3 and plate 4; a small coil spring 6 positioned for restricting relative rotary displacement between the sub-plate 5 and the hub 2; a plurality of large coil springs 7 positioned for restricting relative rotary displacement between the disc 3/plate 4 assembly, and the sub-plate 5; and a friction resistance generating structure 8 for generating a friction force in response to relative rotation between the disc 3/plate 4 assembly and the hub 2.

The friction engaging subassembly B is composed chiefly of an annular cushioning plate 12 and two generally identical friction facings 13 and 23, the friction facing 13 placed on one side of the subassembly B and the friction facing 23 placed upon the opposite side of the subassembly B. The cushioning plate 12 is made up of an annular element 12a, along the periphery of which are integrally formed cushioning portions 12b of a plurality. The annular element 12a is fixed to the clutch disc 3 by abut pins 11, which abut pins 11 in turn fix the disc 3 and plate 4 to each other, holding them in a spaced apart relationship. Each cushioning portion 12b is circumferentially tiered so that in a disengaged state, the friction facings 13 and 23 are spaced apart from one another, as shown in FIG. 2, but in an engaged state, the tiered cushioning portion 12b is elastically deformed by compression forces bringing the friction facings 13 and 23 in closer proximity to one another.

The friction facings 13 and 23 are fastened on opposite sides of the cushioning portions 12b to immediately adjacentmost surfaces thereof by a plurality of rivets 14.

The cushioning plate 12 and the friction facings 13 and 23 have corresponding riveting and specially formed aligning holes, the configuration of which will now be described in detail.

Each of the cushioning portions 12b of the cushioning plate 12 has two rivet holes 12c and 12'c, together with a locating hole 12d. The friction facing 13 has rivet holes 13a, rivet recess holes 13b and locating holes 13c, respectively. The friction facing 23 has rivet holes 23a, rivet recess holes 23b and locating holes 23c, respectively. There is one corresponding rivet hole 12c of the cushioning portions 12b for each rivet hole 13a, and one corresponding rivet hole 12'c for each rivet hole 23a. For instance, a first set of the rivets 14 extend through each of the holes 13a in the friction facing 13, the holes 12c in the cushioning portion 12b and the holes 23b in the friction facing 23. Further another set of the rivets 14 extend through the holes 23a in the friction facing 23, the holes 12'c in the cushioning portion 12b and the holes 13b in the holes 12'c in the cushioning portion 12b and the holes 13b in the friction facing 13. Furthermore, the rivet holes 13a, 23a and rivet recess holes 13b and 23a of the two friction facings 13 and 23, respectively are mutually complementary, as will be described in greater detail below.

Consequently the rivets 14 that extend through the holes 12c fix the friction facing 13 to the cushioning plate 12 and the rivets 14 that extend through the holes 12′c fix the friction facing 23 to the cushioning plate 12.

In the finished clutch disc 1 subassembly B, the rivets 14, with the heads placed in the rivet holes 13a of the friction facings 13 and the shanks penetrating the rivet holes 12c of the cushioning portions 12b, fix the cushioning plate 12 and the friction facing 13 together. Therein, accordingly, the riveted second head of each rivet 14 extends into the rivet recess hole 23b of the friction facing 23, the friction facing 23 being disposed on a side of the subassembly B opposite where the friction facing 13 is disposed Furthermore, the locating holes 13c in the friction facing 13, the locating holes 23c in the friction facing 23 and the locating holes 12d in the cushioning plate 12 are in alignment.

Figure 3:
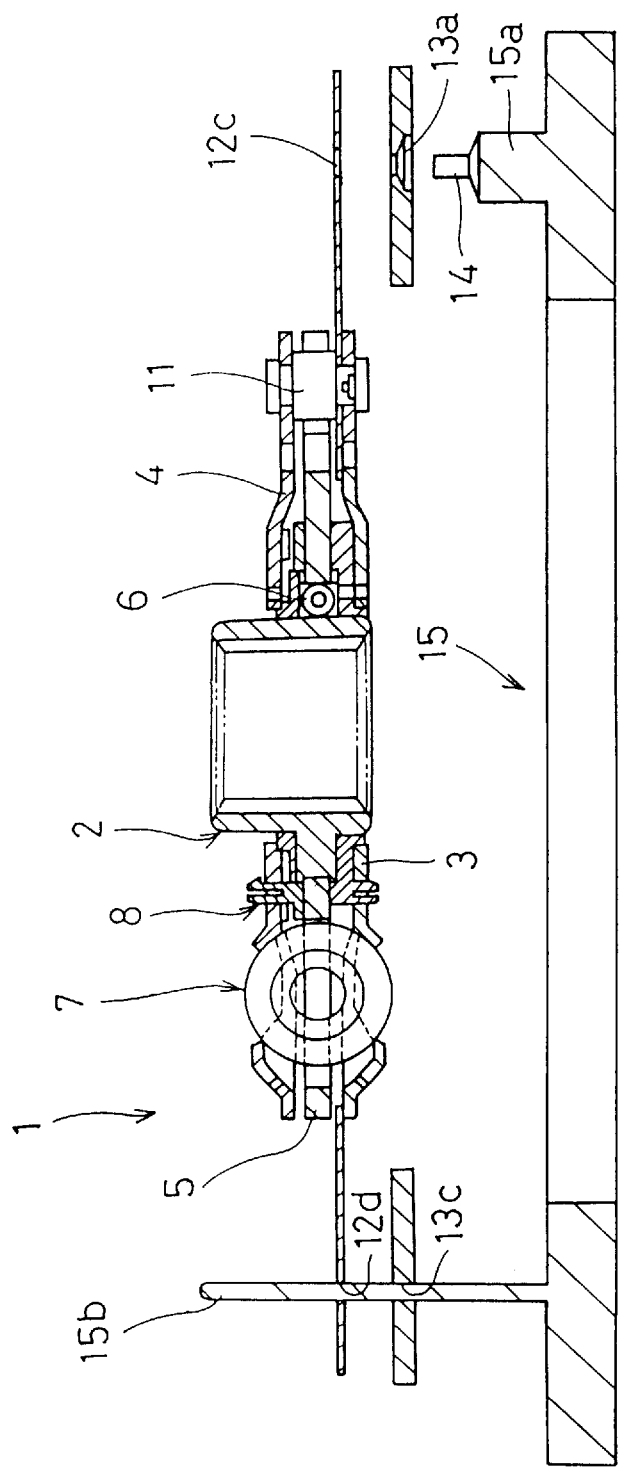
FIG. 3 is a side section similar to FIG. 2 of the clutch disc assembly, together with an aligning jig, in an assembling stage wherein a first friction facing is attached to the clutch disc assembly.

It should be understood that the rivets 14 make no retaining contact with the friction facing 13 via the holes 13b, nor do the rivets 14 make retaining contact with the friction facing 23 via the holes 23b. Rather, the rivets 14 engage the friction facing 13 via the holes 13a, each of which has a tapered portion as shown in FIG. 3. Similarly, the rivets 14 engage and hold the friction facing 23 via the holes 23a, the holes 23a being generally identical to the holes 13a in the friction facing 13.

In vehicular installation, the engine flywheel (not shown) will be situated axially opposing the friction facings 13. When a clutch pressure plate (not shown) clamps the friction facings 13 against the flywheel, torque is input from the engine to the clutch disc assembly 1.

A method of assembling the clutch disc assembly 1, in particular, a method of assembling the friction engaging subassembly B will now be described, where the above-described rivet holes, as well as the locating holes 12d in the cushioning plate 12, locating holes 13c in the friction facings 13, and the locating holes 23c in the friction facings 23 have been formed prior to assembly.

Prior to assembly of the clutch disc main body A the cushioning plate 12 will have been peripherally fixed by the abut pins 11 to the main body A.

An annular locating jig 15 is used in assembling the subassembly B. A plurality of rivet receive seats 15a and a plurality of locating pins 15b are disposed circularly spaced apart on the annular main body of the locating jig 15. The rivet receive seats 15 correspond in number and position to the number and position of the holes 13a in the friction facing 13. The locating pins 15b correspond in number and position to the number and position of the holes 12d in the cushioning plate 12.

In the cushioning plate 12, each pair of locating holes 12d farthest apart are diametrically opposed, lying along a diameter of the clutch disc 1. Each of such pairs of diametrically opposed locating holes 12d defines an axis of symmetry AS (see FIG. 1) about which the disk may be rotated. Specifically, the positioning of the locating holes 12d is completely symmetrical about any one of the above described axis of symmetry, although only one of such axis of symmetry is shown in FIG. 1. However, the rivet holes 13a and 23a are not symmetrical about the axis of symmetry AS. However, with the clutch disc assembly 1 in a first position, as shown in FIG. 1, the rivet holes 13a are in a first position, specifically the rivet holes 13a are positioned at 40°, 100°, 160°, 220°, 280°, and 340°, as shown in FIG. 1. Similarly, rivet holes 23a are positioned at 20°, 80°, 140°, 200°, 260°, and 320°. Upon rotation of the disc assembly 1, 180° about the above described axis of symmetry AS, then the rivet holes 23a would be positioned at 40°, 100°, 160°, 220°, 280°, and 340° and the rivet holes 13a would be positioned at 20°, 80°, 140°, 200°, 260°, and 320°. The rivet holes 13a are symmetrical about the axis of symmetry AS with respect to the rivet holes 23a. This symmetry is important in the practice of the present invention.

In a first position, shown in FIG. 3, the rivet holes 13a are each in alignment with each of the rivet receive seats 15a on the annular locating jig 15.

(1) With reference to FIG. 3, in order to fasten the friction facing 13 to the cushioning plate 12, unfinished rivets 14 are set onto the rivet receive seats 15a of the locating jig 15. The friction facing 13 is positioned onto the locating jig 15, fitting the locating pins 15b into the locating holes 13c, whereby the rivet holes 13a each contain the shank of a rivet 14. Then the cushioning plate 12 is seated, engaging the locating holes 12d onto the locating pins 15b, wherein the rivet holes 12c in the cushioning plate 12 coincide with the rivet holes 13a in the friction facing 13. Thus, the friction facing 13 and the cushioning plate 12 are brought into precise concentric location. The next step is to caulk (deform) the shank tips of the rivets 14 fitted through the rivet holes 12c and 13a, forming second heads opposite the heads set into the rivet holes 13a and consequently fastening together the friction facing 13 and the cushioning plate 12.

Figure 4:
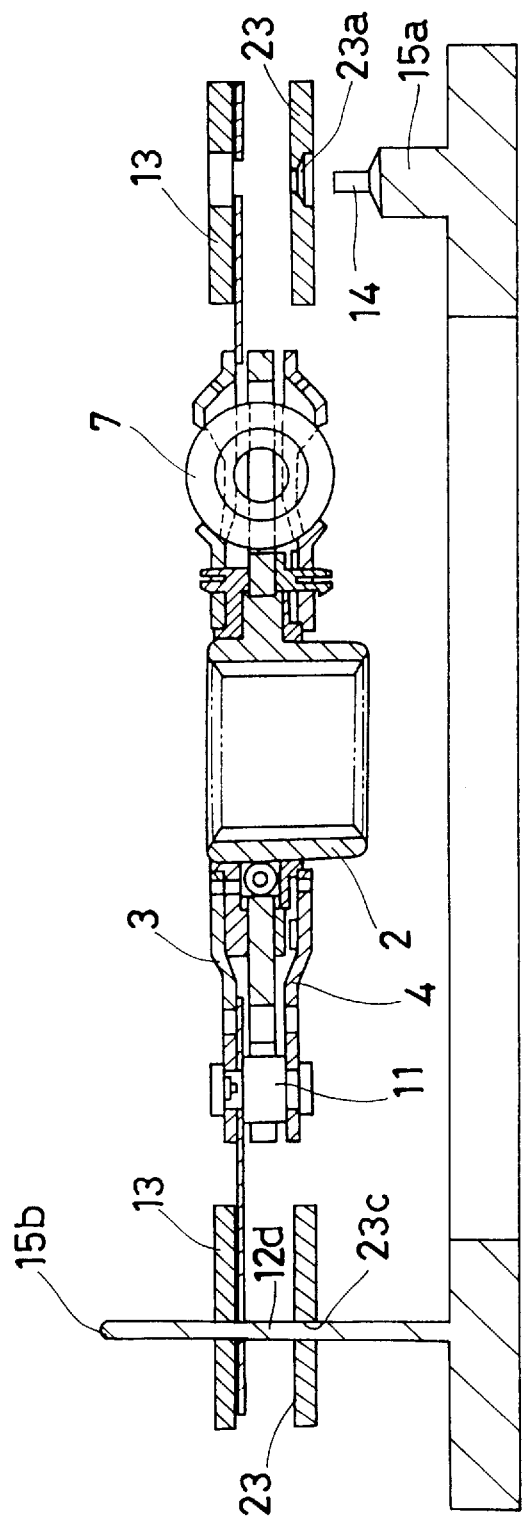
FIG. 4 is a side section similar to FIG. 3 wherein a second friction facing is attached to the clutch disc assembly.

(2) The cushioning plate 12 to which the first friction facing 13 has been fixed is taken off of the locating jig 15. Fresh rivets 14 are set on the rivet receive seats 15a. The second friction facing 23 is then positioned on the locating jig 15, fitting the locating pins 15b into the locating holes 23c. Meanwhile, the clutch disc 1 main body A, with the now partially assembled subassembly B, is then rotated about one of the aforementioned axes of symmetry. The cushioning plate 12 having the friction facing 13 already fixed thereto, is set into position on the jig 15, the locating holes 12d and 13c engaging the aligning pins 15b of the locating jig 15. Accordingly, the rivet recess holes 13b of the friction facing 13, now inverted with respect to the aligning jig 15 as shown in FIG. 4, coincide with the rivet holes 23a of the second friction facing 23, and with the rivet seats 15a carrying fresh rivets 14. Subsequently, the shank tips of the second set of rivets 14, extending through the rivet holes 23a of the second friction facing 23, and through the cushioning plate 12 rivet holes 12c, are caulked. The friction facing 23 and the cushioning plate 12 are consequently fastened together, forming a finished friction engaging subassembly B of the clutch disc 1.

The friction facings 13 and 23, fastened in the operation as described above sandwiching the cushioning plate 12, are meanwhile located in axially opposed precise correspondence, such that there will be little if any positional deviation among the components. Rotational balance of the clutch disc assembly 1 will be satisfactory, consequently minimizing the likelihood that the clutch subassembly B will give rise to vibration in operation. Further, locating the friction facings 13 and 23 to the cushioning plate 12 eliminates the need for an operator alignment check, enabling the clutch subassembly B assembling procedure to be automated.

In an alternate embodiment, the clutch disc 1 subassembly B may employ a non-integral cushioning plate made from a plurality of separate flat portions attached to the disc 3/plate 4 assembly. Such a configuration will attain the same features as in the above-described embodiment.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A method of assembling a clutch disc subassembly, comprising the steps of
    providing a cushioning plate and a pair of friction facings each having corresponding preformed locating holes, rivet holes, and rivet recess holes formed therein;
    positioning the locating holes of one friction facing and the clutch disc onto projecting pins on a locating jig thereby aligning the cushioning plate and the one friction facing; and
    inserting rivets into the rivet holes; and
    deforming the rivets to fix the cushioning plate and the friction facing to one another.

2. The method of assembling a clutch disc subassembly, as set forth in claim 1 further comprising:
    removing the cushioning plate from the locating jig;
    rotating the cushioning plate and the attached friction facing 180° about an axis defined by any two diametrically opposed locating holes;
    positioning the locating holes of a second friction facing and the cushioning plate and attached friction facing onto projecting pins on a locating jig thereby aligning the cushioning plate and the second friction facing;
    inserting rivets into the rivet holes; and
    deforming the rivets to fix the cushioning plate and the second friction facing to one another.

3. A method of assembling a clutch disc subassembly, comprising the steps of:
    providing first and second friction facings having a plurality of preformed circularly spaced axially extending rivet holes and a plurality of circularly spaced rivet recess holes offset from the rivet holes,
    providing a cushioning plate having a plurality of circularly spaced rivet shank holes, corresponding to both the rivet holes and the rivet recess holes in the friction facings, and
    further providing the cushioning plate and both the first and the second friction facings with corresponding pluralities of circularly spaced locating holes, wherein any two farthest apart locating holes, being diametrically opposed, define an axis of locating-hole symmetry with respect to the cushioning plate and the pair of friction facings;
    seating a first set of rivets on a plurality of circularly spaced rivet receive seats formed on an annular locating jig, corresponding in position to a first set of the rivet holes, the jig further formed with a plurality of circularly spaced locating pins corresponding to the locating holes;
    positioning and seating the first friction facing onto the annular locating jig, wherein the locating pins of the annular locating jig are inserted into the locating holes of the first friction facing, and whereby seated heads of the first set of rivets are brought into the rivet holes of the first friction facing;
    positioning the locating holes in the cushioning plate on the locating pins of the annular locating jig and seating the cushioning plate onto the jig thus causing the rivets to extend through the rivet holes in the cushioning plate;
    deforming the first set of rivets fastening together the first friction facing and the cushioning plate;
    taking the cushioning plate and attached first friction facing off the annular locating jig;
    seating a second set of rivets on the rivet receive seats;
    positioning and seating the second friction facing onto the annular locating jig, wherein the locating pins of the annular locating jig are inserted into the locating holes of the second friction facing, whereby seated heads of the second supply of rivets are brought into the rivet holes of the second friction facing;
    rotating 180°, on the axis of locating-hole symmetry, the cushioning plate and the attached first friction facing, and
    positioning the locating holes in the cushioning plate onto the locating pins of the annular locating jig, whereby the first set of rivets are brought into the rivet recess holes of the second friction facing; and
    deforming the second set of rivets fastening the second friction facings to the cushioning plate.

* * * * *